(12) United States Patent
Ibach et al.

(10) Patent No.: US 7,952,728 B2
(45) Date of Patent: May 31, 2011

(54) ROBOT-CONTROLLED OPTICAL MEASUREMENT ARRAY, AND METHOD AND AUXILIARY MECHANISM FOR CALIBRATING SAID MEASUREMENT ARRAY

(75) Inventors: Thomas Ibach, Rastatt (DE); Bernhard Laubel, Bischweier (DE); Matej Leskovar, Munich (DE); Holger Linnenbaum, Rastatt (DE); Martin Paskuda, Steinmauern (DE)

(73) Assignee: KUKA Roboter GmbH, Augsburg (DE)

( * ) Notice: Subject to any disclaimer, the term of this patent is extended or adjusted under 35 U.S.C. 154(b) by 629 days.

(21) Appl. No.: 11/568,605

(22) PCT Filed: May 3, 2005

(86) PCT No.: PCT/EP2005/004796
§ 371 (c)(1),
(2), (4) Date: Aug. 17, 2007

(87) PCT Pub. No.: WO2005/108020
PCT Pub. Date: Nov. 17, 2005

(65) Prior Publication Data
US 2008/0216552 A1    Sep. 11, 2008

(30) Foreign Application Priority Data

May 4, 2004    (DE) .......................... 10 2004 021 892

(51) Int. Cl.
*G01B 11/14*    (2006.01)
(52) U.S. Cl. .......................................... 356/614; 901/47
(58) Field of Classification Search ............. 356/139.03, 356/399, 401, 620; 702/95; 901/46, 47
See application file for complete search history.

(56) References Cited

U.S. PATENT DOCUMENTS

| | | | | |
|---|---|---|---|---|
| 4,754,415 A | * | 6/1988 | George et al. | 700/250 |
| 6,299,122 B1 | * | 10/2001 | Bame | 248/466 |
| 6,615,112 B1 | * | 9/2003 | Roos | 700/254 |
| 2004/0100705 A1 | * | 5/2004 | Hubbs | 359/819 |

FOREIGN PATENT DOCUMENTS

| | | | |
|---|---|---|---|
| EP | 0114505 A1 | * | 8/1984 |
| WO | WO97/46925 | * | 12/1997 |

* cited by examiner

*Primary Examiner* — Tarifur Chowdhury
*Assistant Examiner* — Michael LaPage
(74) *Attorney, Agent, or Firm* — Wood, Herron & Evans, LLP

(57) ABSTRACT

Disclosed is a robot-controlled optical measurement array (1) comprising an optical sensor (2) that is fastened to a spacer (3). Reference marks (22) are provided on the spacer (3) and/or on a sensor (2) housing (2'). Said optical measurement array (1) is calibrated by means of an auxiliary device (13) that is placed on the optical measurement array (1) and is provided with a sensor target (16) which is disposed on the auxiliary device so as to lie within one measurement space (17) of the optical sensor (2) when the optical measurement array (1) and the auxiliary device (13) are in the assembled state. In order to calibrate the optical measurement array (1), measured values of the sensor target (16) are generated with the aid of the sensors (2), said measured values being used for calculating the three-dimensional position of the sensor coordinate system (10) in relation to the sensor target (16). Furthermore, measurements of the three-dimensional positions of the reference marks (22) and the auxiliary device are taken using an additional (stationary) measuring apparatus (21). The three-dimensional position of the sensor coordinate system (10) relative to the reference marks (22) can be determined with great accuracy from a combination of all of said measurements.

8 Claims, 2 Drawing Sheets

ROBOT-CONTROLLED OPTICAL MEASUREMENT ARRAY, AND METHOD AND AUXILIARY MECHANISM FOR CALIBRATING SAID MEASUREMENT ARRAY

TECHNICAL FIELD

The invention pertains to an optical measurement array for use on a measuring robot. The invention furthermore pertains to an auxiliary device and a method for calibrating the optical measurement array.

BACKGROUND

A robot-controlled optical sensor for measuring one or more measurement areas of workpieces in the production environment, for example, on car bodies, is known from U.S. Pat. No. 6,321,137 B1. The optical sensor is mounted on the robot arm and is positioned relative to the workpiece in selected measurement areas with the aid of the robot. The utilization of an optical sensor provides the advantage that such a sensor measures in a contactless fashion and therefore has a substantially faster measuring speed and a lower sensitivity to vibrations than a tactile sensor. This makes it possible to carry out fast and robust measurements in the production environment. The positioning of the optical sensor with the aid of a robot provides the additional advantage of a high flexibility and reduced costs; the positioning with the aid of a robot also makes it possible to achieve an adequate reproducibility and accuracy of the measurement results.

However, this can only be realized if a highly accurate calibration of the complete system—consisting of the robot and the optical sensor—is carried out prior to the actual measuring operation. In this case, it is common practice to initially calibrate the robot by determining its axial error and compensating this axial error with the aid of the control system. In the calibration of the optical sensor system, the error of the sensor optics is compensated and the position of the sensor coordinate system relative to an external reference point, for example, the sensor housing, is determined. It is also necessary to relate the position of the sensor coordinate system to the position of the robot coordinate system in order to determine the position of measuring points of the sensor in the robot coordinate system.

In this context, U.S. Pat. No. 6,321,137 B1 proposes to move the optical sensor into different positions in space relative to a reference body with the aid of the robot and to carry out a calibration of the complete system based on the data from sensor measurement of the reference body obtained in these spatial positions. In this case, however, only a relatively low accuracy is empirically achieved that does not suffice for many applications in the production environment, particularly for measurements on car bodies (shells).

SUMMARY

Consequently, the invention is based on the objective of designing a robot-controlled optical measurement array in such a way that it can be quickly and easily calibrated. The invention furthermore aims to propose a method and an auxiliary device that make it possible to carry out this calibration process quickly and in a reproducible fashion.

According to the invention, these objectives are attained with the characteristics of claims 1, 4 and 6.

According to these characteristics, the optical measurement array comprises an optical sensor that is mounted on a robot with the aid of a spacer, wherein reference marks are provided on the spacer and/or the sensor housing. These reference marks consist, for example, of steel spheres, the centers of which can be determined in a highly accurate fashion with the aid of a tactile measuring means, particularly the sensing element of a coordinate measuring machine. Alternatively, the reference marks can also consist of retroreflectors, in which case a highly accurate measurement of the position of these reference marks can be realized with the aid of a laser tracker. According to one particularly advantageous embodiment, the reference marks consist of retroreflector spheres such that the position of these reference marks can be measured in a tactile as well as an optical fashion. These spheres are preferably mounted on the optical measurement array in a detachable fashion, namely such that they can be removed (during the measuring operation) and reattached to the optical measurement array in a precisely reproducible fashion in order to carry out a calibration or a validation measurement.

The calibration of the optical sensor is realized with an auxiliary device that can be mounted on the optical measurement array—preferably in a precisely reproducible fashion. The auxiliary device features a sensor target that is arranged to the auxiliary device such that it lies within a measurement space of the optical sensor in the assembled state of the auxiliary device and the optical measurement array.

In the calibration of the optical measurement array, the position of the sensor coordinate system (also referred to as TCP=Tool Center Point) relative to the reference marks fixed on the measurement array needs to be determined. The auxiliary device is fixed on the optical measurement array for this purpose. One or more measurements of the sensor target of the auxiliary device are then carried out with the aid of the optical sensor; the position of the sensor target in the sensor coordinate system is determined based on the measurement (s). In addition, the position in space of the reference marks fixed on the optical measurement array relative to the auxiliary device is measured by means of another (optical or tactile) measuring system. The position of the sensor coordinate system of the optical measurement array relative to the reference marks is calculated from a joint evaluation of these measurements. In order to determine the position in space of the auxiliary device relative to the reference marks of the optical measurement array in a highly accurate fashion, it is advantageous also to provide the auxiliary device with reference marks.

A suitable arrangement of the reference marks on the optical measurement array and on the auxiliary device makes it possible to determine the position in space of the sensor coordinate system relative to the reference marks of the optical measurement array in a highly accurate fashion. This calibration of the optical measurement array can be carried out in a measurement space, for example, in a (tactile) coordinate measuring device. Since a small, lightweight and robust auxiliary device that can be easily handled is used for the calibration process, the calibration of a robot, on the robot arm of which the optical measurement array is mounted, can also be carried out directly in the factory environment. In this case, the reference marks fixed on the optical measurement array can also be used for determining the position in space of the optical measurement array relative to the robot coordinate system in a highly accurate fashion—for example, with the aid of a laser tracker—and in this fashion to detect and compensate for the errors and inaccuracies occurring during the transformation of the sensor measured values into the robot coordinate system.

BRIEF DESCRIPTION OF THE DRAWINGS

The invention is described in greater detail below with reference to an embodiment that is illustrated in the figures.

The figures show.

DETAILED DESCRIPTION

Figure 1:
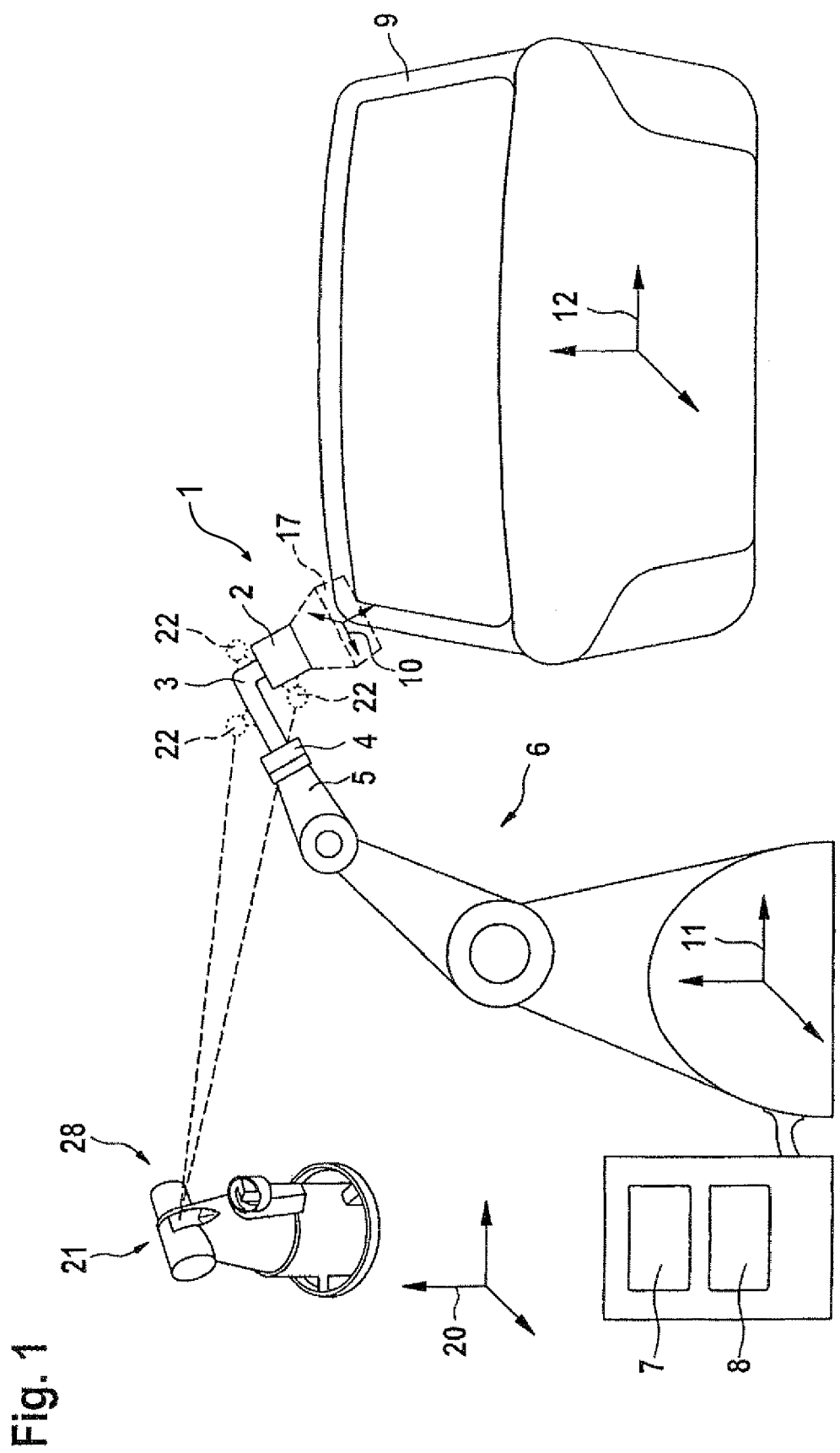
FIG. 1, a schematic representation of a robot-controlled optical measurement array, and FIG. 2, a schematic representation of an inventive auxiliary device for calibrating the optical measurement array according to FIG. 1.

FIG. 1 shows a schematic representation of an inventive optical measurement array 1 with an optical sensor 2 that is mounted on a spacer 3. The spacer 3 features a flange 4 that serves for mounting the optical measurement array 1 on a robot arm 5 of a multiaxis manipulator, particularly a six-axis industrial robot 6. An evaluation unit 7 is provided for storing and evaluating the measuring data of the optical sensors 2. The robot 6 is connected to a robot control unit 8 in order to control the motion of the robot arm 5. The robot 6 is calibrated prior to the measuring operation by determining and compensating for its axial error with the aid of the control unit 8.

In the measuring operation, measured values of an object 9 to be measured are obtained with the aid of the optical sensors 2, with these measured values being generated in a sensor coordinate system 10 (that is moved together with the optical measurement array 1). In order to transform the measured values into a stationary robot coordinate system 11 or a coordinate system 12 of the object 9 to be measured, the position in space of the sensor coordinate system 10 in the robot coordinate system 11 as a function of the movement of the robot arm 5 needs to be known. This requires a "calibration" the optical measurement array 1.

Figure 2:
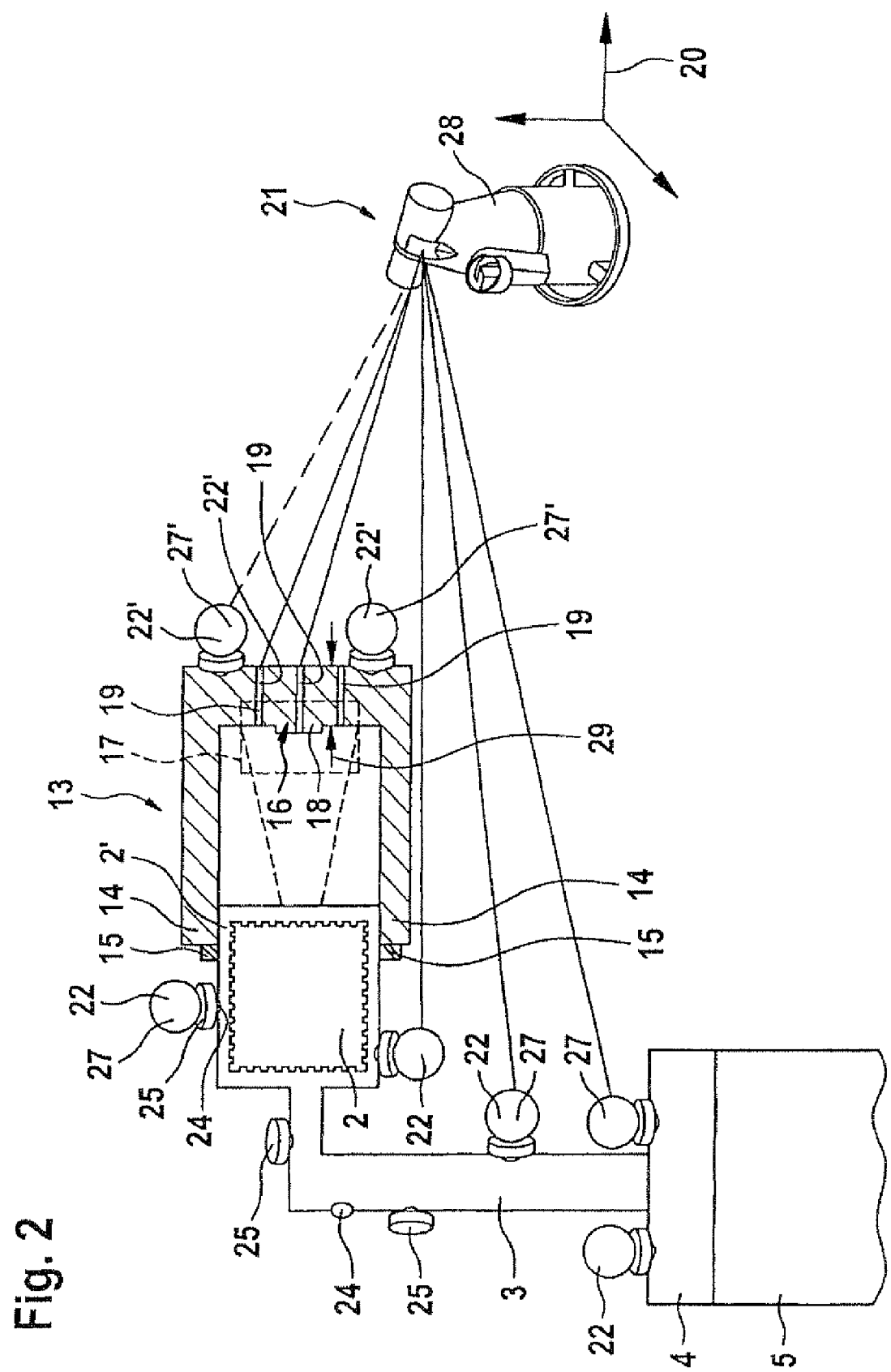

The auxiliary device 13 shown in FIG. 2 is used for this purpose. The auxiliary device is realized in the form of "spectacles" that are attached to the optical measurement array 1 for the calibration process and consequently feature a mounting region 14 for fixing the auxiliary device on the housing 2' of the sensor 2. In order to ensure that the auxiliary device can be fixed relative to the sensor 2 in a reproducible fashion, the sensor housing 2' is advantageously provided with limit stops 15 that define the relative position of the mounting region 14 with respect to the sensor housing 2'. A sensor target 16 is arranged on the auxiliary device 13 such that it is situated, when the auxiliary device 13 is attached to the sensor 2, in the measurement volume 17 of the optical sensor 2. The sensor target 16 features geometric characteristics 18, 19 that make it possible to quickly and accurately calculate the position and the orientation of the sensor 2 relative to the sensor target 16. These geometric characteristics 18, 19 are adapted to the measuring principle of the optical sensors 2. The optical sensor 2 used in the described embodiment is able to generate three-dimensional measuring points (with the aid of the laser stripe method), as well as to detect two-dimensional characteristics (with the aid of a gray scale image evaluation). In this case, the sensor target 16 comprises—as indicated in FIG. 2—one or more vertical steps 18 (the position in space of which can be measured with the aid of the light section method). The sensor target 16 furthermore features several bores 19 (the centers of which can be calculated by means of image processing of the gray scale images). This makes it possible to determine in a highly accurate fashion the position in space and the angular position of the sensor target 16 in the sensor coordinate system 10.

In order to determine the position in space of the auxiliary device 13 during the course of calibration of the optical measurement array 1 with the aid of a stationary measuring device 21, for example, a laser tracker 28, the auxiliary device 13 needs to be provided with reference marks 22' that can be measured by the stationary measuring device 21. These reference marks 22' may consist, for example, of retroreflector spheres 27', the positions of which relative to the sensor target 16 are determined in a calibration process (carried out prior to the calibration of the optical measurement array 1), namely with the aid of a tactile coordinate measuring machine. Alternatively, these reference marks 22' may also consist of bores 19 of the sensor target 16 that are realized in the form of through-holes such that the position of the bores 19 can be determined by carrying out a measurement with the stationary measuring device 21 and deducing the position of the sensor target 16 based on this measurement (provided that the local wall thickness 29 of the auxiliary device 13 and the step height 18 of the sensor target 16 are known).

The optical measurement array 1 is calibrated by attaching the auxiliary device 13 to the optical measurement array 2 (which is mounted on the robot arm 5). Three measurements are carried out in this state:

1. Measurements of the sensor target 16 are carried out with the aid of the sensor 2, with the position in space of the sensor coordinate system 10 relative to the sensor target 16 being determined based on these measurements.

2. Measurements of the reference marks 22' of the auxiliary device 13 are carried out with the aid of the stationary measuring device 21, with the position in space of the auxiliary device 13 (and consequently also the position of the sensor target 16 that is rigidly connected to the auxiliary device 13) being calculated in a coordinate system 20 of the stationary measuring device 21 based on these measurements.

3. The position in space of the optical measurement array 1 in the coordinate system 20 of the stationary measuring device 21 is determined with the aid of the stationary measuring device 21. For this purpose, reference marks 22 are provided on the optical measurement array 1 such that they can be measured with the stationary measuring device 21. In the described embodiment, in which the stationary measuring device 21 consists of a laser tracker, these reference marks 22 consist of retroreflector spheres 27 that are respectively mounted on the spacer 3 and the housing 2' of the optical sensor 2. In order to mount the retroreflector spheres 27, the spacer 3 and the sensor housing 2' contain threaded holes 24, into which so-called "nesting elements" 25 are screwed. These "nesting elements" 25 are realized in the form of annular plates, into which the retroreflector spheres 27 can be reproducibly inserted in an accurately defined position. The "nesting elements" 25 are provided with magnetic elements such that the retroreflector spheres 27 are securely fixed and held in the "nesting elements" 25—regardless of the spatial orientation of the "nesting elements" 25. In the embodiment shown in FIG. 2, only a few threaded holes 24 are fitted with "nesting elements" 25, and only a few of these "nesting elements" 25 are illustrated with retroreflector spheres 27 fixed therein. A person skilled in the art is familiar with the fact that the number and position of the reference marks 22 significantly influence the accuracy in determining the position in space of the optical measurement array relative to the coordinate system 20 of the stationary measuring device 21. Careful selection of the reference marks 22 is therefore crucial to the quality of the calibration result.

The position of the sensor coordinate system 10 relative to the reference marks 22 fixed on the optical measurement array 1 can be determined in a highly accurate fashion from a combination of measurements 1., 2. and 3. If the optical measurement array 1 is moved into different positions in space with the aid of the robot 6, the current position of the sensor coordinate system 10 can be deduced for each of these positions in space based on a measurement of the reference marks 22. If the stationary measuring device 21 were calibrated to the coordinate system 12 of the object 9 to be measured, the current position of the sensor coordinate system 10 (and therefore also the position in space of the measuring data obtained by means of the sensor 2) can be calculated in the coordinate system 12 of the object 9 to be measured (e.g., in a vehicle coordinate system). It is therefore expedient, before the beginning of the actual measuring operation, to measure with the aid of the stationary measuring device 21 and the reference marks 22 the position in space of the optical measurement array 1. This is determined for all spatial positions in which measurements are to be carried out on the object 9 to be measured during the measuring operation.

The support of the retroreflector spheres 27 in magnetic "nesting elements" 25 provides the advantage that the retroreflector spheres 27 can be removed during the measuring operation; this reduces the weight of the optical measurement array 1 and therefore the load on the robot arm 5 during the measuring operation; the space requirement of the optical measurement array 1 is also reduced. If it becomes necessary to carry out another calibration of the optical measurement array 1 or of the measuring robot 6 during the measuring operation (e.g., due to a crash of the measuring robot 6), the retroreflector spheres 27 can be inserted into the "nesting elements" 25 at any time in a reproducible fashion.

With respect to the above-described design of the reference marks 22 in the form of retroreflector spheres 27, it should be noted that the reference marks 22 may also be realized in any other suitable fashion. The measurement of the reference marks 22 carried out with the aid of the laser tracker 28 during the calibration process can also be replaced with any other optical or tactile measurement method.

The auxiliary device 13 can be used in connection with optical measurement arrays 1 that are based on different measurement principles, particularly for laser stripe sensors, CCD cameras with gray scale image processing, strip projection sensors, etc.

The invention claimed is:

1. An optical measurement array for use on a multi-axis manipulator having an end-effector mounting flange for mounting implements used with the manipulator, the optical measurement array comprising:
    a spacer mounted on the mounting flange of the manipulator;
    an optical sensor having a housing coupled to the spacer; and
    reference marks on at least one of the spacer or the housing, the reference marks positioned for detection by an external measuring device;
    wherein the reference marks comprise retroreflecting spheres.

2. The optical measurement array of claim 1, further comprising:
    an auxiliary device for calibrating the optical measurement array, the auxiliary device being selectively removably coupled to the optical sensor housing; and
    reference marks on the auxiliary device and positioned for detection by the external measuring device.

3. An optical measurement array for use on a multi-axis manipulator having an end-effector mounting flange for mounting implements used with the manipulator, the optical measurement array comprising:
    a spacer mounted on the mounting flange of the manipulator;
    an optical sensor having a housing coupled to the spacer; and
    reference marks on at least one of the spacer or the housing, the reference marks positioned for detection by an external measuring device;
    wherein the reference marks are selectively removably coupled to at least one of the spacer or the housing.

4. The optical measurement array of claim 3, further comprising:
    an auxiliary device for calibrating the optical measurement array, the auxiliary device being selectively removably coupled to the optical sensor housing; and
    reference marks on the auxiliary device and positioned for detection by the external measuring device.

5. An auxiliary device for calibrating an optical measurement array mounted on a manipulator and having an optical sensor, the auxiliary device comprising:
    mounting structure for selectively removably coupling the auxiliary device to the optical measurement array;
    a sensor target that is positioned in a measurement space of the optical sensor when the auxiliary device is coupled to the optical measurement array; and
    reference marks comprising retroreflecting elements positioned for detection by an external measuring device.

6. A method for calibrating an optical measurement array that can be mounted on a manipulator and on which reference marks are provided, the optical measurement array including an optical sensor, the method comprising:
    mounting an auxiliary device on the optical measurement array, the auxiliary device comprising:
        mounting structure for selectively removably coupling the auxiliary device to the optical measurement array,
        a sensor target that is positioned in a measurement space of the optical sensor when the auxiliary device is coupled to the optical measurement array, and
        reference marks comprising retroreflecting elements positioned for detection by an external measuring device;
    generating measured values of the sensor target of the auxiliary device with the aid of the optical sensor;
    determining the position in space of the reference marks and the position in space of the auxiliary device with the aid of an external measuring device; and
    determining the position of a sensor coordinate system relative to the reference marks from a combination of the positions determined with the external measuring device and the measured values generated with the optical sensor.

7. The method according to claim 6, wherein the external measuring device comprises a laser tracker.

8. The method according to claim 6, wherein the optical measurement array is mounted on the manipulator while the calibration process is being carried out.

* * * * *